United States Patent [19]
Zinn et al.

[11] 3,769,159
[45] Oct. 30, 1973

[54] FUEL ELEMENT GRID SUPPORT FOR NUCLEAR REACTOR

[75] Inventors: Walter H. Zinn, Glastonbury; Harold V. Lichtenberger, West Simsbury, both of Conn.

[73] Assignee: Combustion Engineering, Inc., Windsor, Conn.

[22] Filed: June 24, 1968

[21] Appl. No.: 739,224

[52] U.S. Cl. .................................................. 176/78
[51] Int. Cl. ............................................ G21c 3/34
[58] Field of Search .............................. 176/76, 78

[56] References Cited
UNITED STATES PATENTS

| 3,255,091 | 6/1966 | Frisch | 176/76 X |
| 3,350,275 | 10/1967 | Venier et al. | 176/76 X |
| 3,379,617 | 4/1968 | Andrews et al. | 176/76 X |
| 3,398,053 | 9/1968 | Huber et al. | 176/78 |
| 3,431,170 | 3/1969 | Lass et al. | 176/78 |
| 3,442,763 | 5/1969 | Chetter et al. | 176/76 X |
| 3,457,140 | 7/1969 | Glandin | 176/76 X |

*Primary Examiner*—Harvey E. Behrend
*Attorney*—Carlton F. Bryant, Eldon H. Luther, Robert L. Olson, John F. Carney, Richard H. Berneike, Edward L. Kochey, Jr. and Lawrence P. Kessler

[57] ABSTRACT

A support grid for the fuel assembly of a nuclear reactor. The grid being generally of the egg crate type of construction with the crossed grid plates being of a material having a low neutron absorption cross-section (Zircaloy). Springs to prevent fuel element movement are secured to these grid plates with the springs being of a high nickle alloy steel such that their load carrying capability resulting from stress relaxation during operation of the reactor is greater than would be the case if fabricated of the material of the grid plates.

8 Claims, 8 Drawing Figures

PATENTED OCT 30 1973 3,769,159

INVENTORS
WALTER H. ZINN
HAROLD V. LICHTENBERGER

BY *Eldon H. Luther*
ATTORNEY

INVENTOR
WALTER H. ZINN
HAROLD V. LICHTENBERGER
BY Eldon H. Luther
ATTORNEY

FUEL ELEMENT GRID SUPPORT FOR NUCLEAR REACTOR

BACKGROUND OF THE INVENTION

Nuclear reactors which are provided with a core made up of numerous separately removable fuel assemblies utilize, as part of the fuel assembly, grid support plates to maintain the fuel elements in proper alignment and in their desired spaced relation. Since cooling fluid flows rather rapidly over the fuel elements, there is a tendency for the elements to vibrate and accordingly, as part of the support grid, there are provided spring members to securely retain the elements in place and prevent them from moving and thus prevent fretting or wear type damage to the cladding of the element.

It is desired to provide as economic an arrangement as possible in connection with these support grids. One of the economic factors that weighs heavily in the material chosen for the grid is the neutron absorption cross section of the material. In this connection it would be desirable to use one of the known ZIrcaloy alloys to fabricate all parts of the support assembly. However the rate of stress relaxation of Zircaloy because of being subjected to radiation within the reactor and also to some extent because of the elevated operating temperature is sufficiently high to be of concern to reactor designers. The conditions may be such as to cause the spring members in the fuel assembly, if they were made of Zircaloy, to lose most of their stress such that the springs are incapable of supporting much of any load during the latter part of the life of the reactor core. This will result in movement and accordingly fretting of the fuel elements where they contact the spring or other wall portion of the grid.

This condition can be substantially improved by fabricating the spring portion of the support assembly of a material having a substantially lower rate of stress relaxation resulting from being subjected to the operating condition within the reactor. High nickel alloys are such materials.

SUMMARY OF THE INVENTION

In accordance with the invention such a bimetallic support grid is provided wherein the high nickel alloy spring members are provided on two adjacent walls of each of the fuel compartments in the grid. These spring members are secured in place by having a pair of spaced portions that are received in and extend through openings in the adjacent grid wall. These portions are deformed after being positioned through the openings such as to securely fasten the spring member in place. These deformed portions act as spacers and engage the fuel element so as to maintain it in spaced relation with the grid wall thereby providing a passage for coolant flow. The spring portion itself includes an extension that is reversely bent and engages the fuel element when the element is positioned in the grid compartments.

DETAILED DESCRIPTION OF THE PREFERRED EMBODIMENT

Figure 8:
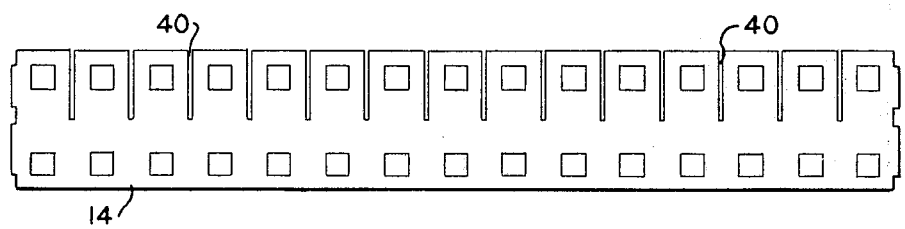
FIG. 8 is an elevational view of one of the grid plates of the fuel assembly grid support.

Referring now to the drawing wherein like reference characters are used throughout to designate like elements, the illustrative and preferred embodiment of the invention depicted therein comprises a fuel assembly grid support designated generally 10 and which is comprised of a peripheral support band 12 between the opposite walls of which extend the crossed grid plates 14. This entire assembly is in the nature of an "egg crate" construction with the crossed grid plates being slotted as at 40 (FIG. 8) such that they may be intermeshed as shown. The ends of the plates 14 are received in the slots 36 in the peripheral support band and the entire structure is welded together to form a rigid construction.

The peripheral band 12 and the plates 14 are fabricated of one of the Zircaloy alloys such as Zircaloy 2 or Zircaloy 4 which have the following analysis:

|  | Zircaloy 2 | Zircaloy 4 |
|---|---|---|
| Tin | 1.20 to 1.70 | 1.20 to 1.70 |
| Iron | 0.07 to 0.20 | 0.18 to 0.24 |
| Chromium | 0.05 to 0.15 | 0.07 to 0.13 |
| Nickel | 0.03 to 0.08 |  |
| Iron plus Chromium plus Nickel | 0.18 to 0.38 | 0.28 to 0.37 |
| Remainder — Zirconium and Minor Impurities |  |  |

Zircaloy is chosen for the plates and peripheral band of the grid support because of its very low parasitic absorption of neutrons as well as its other acceptable qualities for reactor use.

In order to securely retain the fuel elements 16 in each of the fuel element compartments 18 of the grid support there is associated with each compartment two spring members 20. These spring members are positioned on adjacent intersecting walls of the fuel element compartment and are fixidly secured to the walls.

Figure 1:
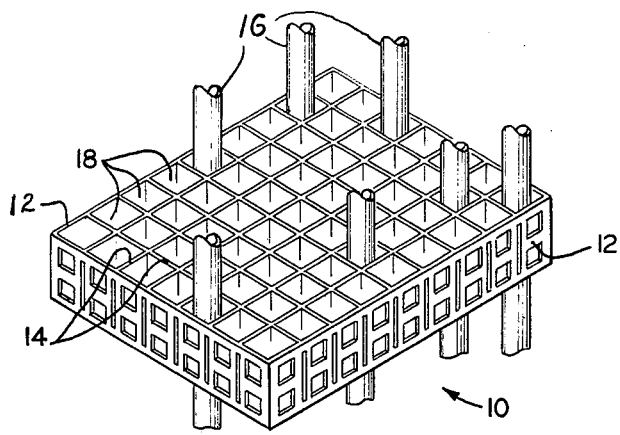
FIG. 1 is a perspective view of the fuel assembly support grid of the invention showing a fuel element positioned in the grid.
Figure 2:
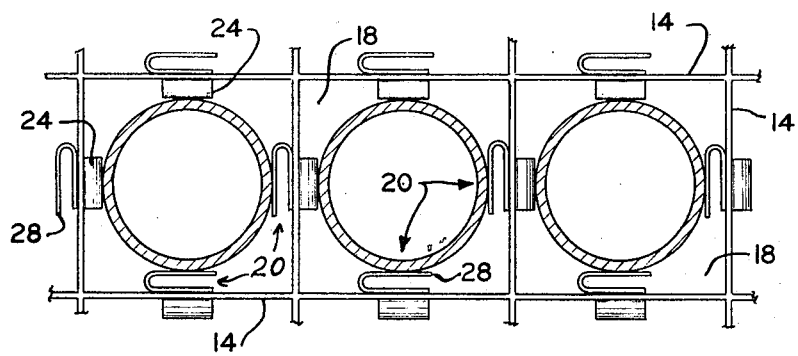
FIG. 2 is a top view, fragmentary in nature, showing some of the fuel compartments of the support grid assembly.
Figure 3:
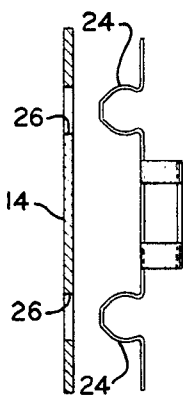
FIG. 3 is an exploded elevational view showing the spring member just prior to being positioned in place in the openings in the grid plate.
Figure 4:
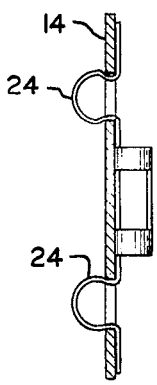
FIG. 4 is a view similar to that of FIG. 3 but showing the assembly in place with the laterally extending regions of the support portion of the spring being deformed to secure the element to the grid plate.
Figure 6:
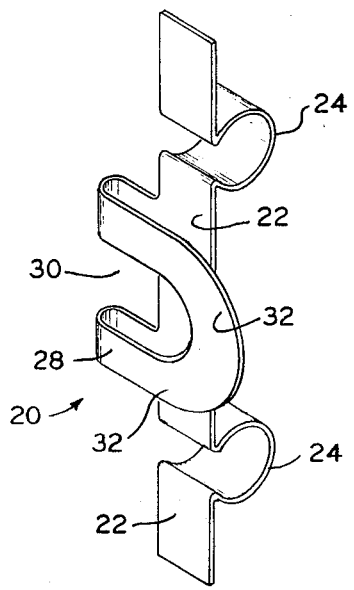
FIG. 6 is a perspective view of the spring members per se.
Figure 5:
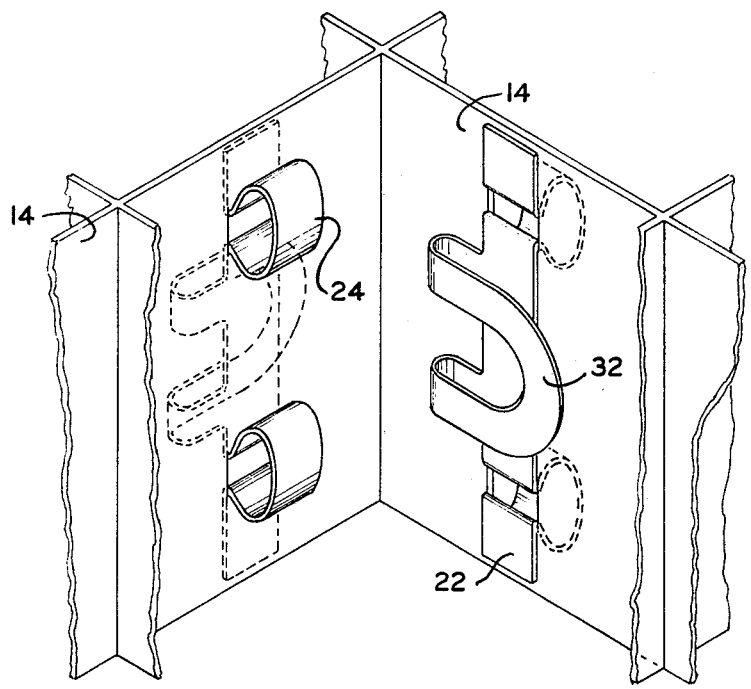
FIG. 5 is a detailed perspective view showing a portion of one of the fuel element compartments.
Figure 7:
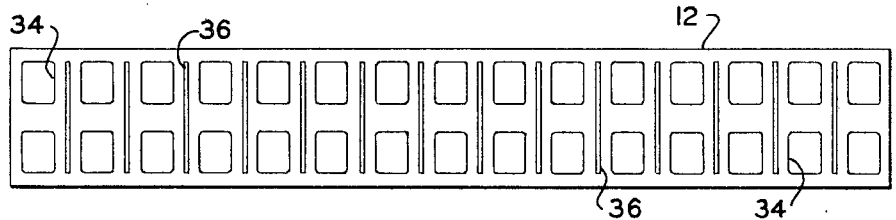
FIG. 7 is an elevational view of a portion of the peripheral support band of the fuel assembly grid support.

Each of these spring members 20 includes an elongated support portion 22 which is provided with longitudinally spaced laterally extending regions 24. These spaced regions are received within complimentary openings 26 in the wall of the compartment 18. After being received within these openings the regions 24 are deformed, as shown in FIG. 4 and 5, so as to positively secure the spring member 20 in place. The actual spring portion of member 20 is in the form of a U-shaped region or portion 28 that extends laterally from the support portion 22 and is reversely bent as shown in FIGS. 2, 5 and 6 so as to provide a profile generally parallel with the grid plate 14. By forming the spring in this manner such that an opening 30 is provided between the legs 32 of the U-shaped spring portion 28, limited contact with the fuel element is provided such that cooling of the element is facilitated.

The spring member 20 is so disposed that the laterally extending regions 24 which project into the adjacent fuel element compartment are vertically one above the other and thus generally in a plane parallel with the axis of a fuel element received in that compartment. They are located laterally in a generally central position on the compartment wall such that they engage the fuel element when it is placed in the compartment and act to space the fuel element from the wall of the compartment and provide a passage for coolant flow.

The spring members 20 are made of a high nickel alloy and one such material that is currently available and advantageous for this use is Inconel X-750 which has a composition of:

Nickel –70.0 Min.
Chromium –14–17
Iron –5–9
Columbium –0.7–1.2
Molybdenum –0–0.5
Aluminum –0.4–1.0 Titanium –2.25–2.75
Carbon –0.08 Max.
Silicon –0.5 Max.
Manganese –1.0 Max.
Sulphur –0.01 Max.
Copper –0.5 Max.

By mounting the springs as thus disclosed, the U-shaped spring region 28 is effective to urge the fuel element toward and into engagement with the upset regions 24 as best shown in FIG. 2. The fuel element is thus spaced from each of the walls of the compartment such as to provide for adequate passage of coolant. This construction prevails in all but the outer row of the fuel assembly support grid. In the outer row the fuel elements are urged into engagement with the peripheral support band and for this reason the support band has openings 34 to facilitate cooling.

With the arrangement of the invention a fuel assembly grid support of the egg crate type is provided wherein the greater part of the assembly is fabricated of a material that has a very low neutron absorption cross section and springs are of a material which while having a higher neutron absorption cross section has a better load carrying capability than would be the case if the springs were of the same material as the grid plates. The construction of the assembly provides, in a relatively simple manner, for positive securement of the springs in place with the spring assembly having the dual function of spacing the fuel elements from the walls of the fuel element compartments and securely retain them in place such that they cannot vibrate.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. A fuel assembly grid comprising a plurality of crossed grid plates secured together to form numerous fuel element compartments for receipt of fuel elements, said plates being of a material of low neutron absorption cross section, two adjacent side walls of at least some of said compartments having spring members secured thereto, said spring members being of a material having a load carrying capability after relaxation resulting from radiation that is substantially greater than that of the material of the grid plates, said spring members having portions received in openings in said plates and upset so that the spring member is secured to the plate.

2. The fuel assembly grid of claim 1 wherein the upset portion extends into the adjacent compartment and is so disposed as to engage the fuel element when disposed therein and retain it is spaced relation with the plate.

3. The fuel assembly grid of claim 2 wherein the grid plates are of one of the Zircaloy alloys and the spring members are of a high nickel alloy steel, 4. A fuel assembly grid of claim 1 wherein each of the springs comprises an elongated support portion which has two longitudinally spaced laterally extending regions that are received in complimentary holes in the grid plates and are upset sufficiently to prevent removal therefrom, a U-shaped portion extending from the support portion and being reversely bent to provide a U-shaped profile generally parallel with the grid plate which the spring member overlies and is secured to.

5. The fuel assembly of claim 4 wherein the two spaced upset portions are in a plane parallel with the axis to the associated compartment and vertically one above the other when the compartment axis is vertical, such that they will both contact the fuel element received in the compartment into which they extend.

6. An egg crate guide assembly including guide plates of a material of one of the Zircaloy alloys, and spring members of a material of a higher load carrying capability after relaxation as a result of being subjected to radiation and a higher initial stress than said Zircaloy alloys, said spring members being effective to firmly hold fuel elements in the compartments of the assembly, said members being secured to said plates by having a portion extending through an opening in the plate, said portion being deformed to prevent removal and said portion extending into the adjacent compartment to maintain the fuel element spaced from the plate.

7. The egg crate guide assembly of claim 6 wherein said spring members are made of a high nickel alloy.

8. The egg crate guide assembly of claim 7 wherein the spring members comprise an elongated support portion and a U-shaped spring portion extending laterally therefrom and being reversely bent so as to provide a fuel element engaging region that is parallel with the grid plate, said support portion having a plurality of longitudinally spaced laterally extending regions, said plates having complimentary openings provided therein for receipt of these regions, said regions being generally in a plane parallel with the axis of the fuel element to be received in the fuel element compartments.

* * * * *